July 5, 1927.
H. C. COLE
1,634,931
AIR DRYING SYSTEM
Filed March 5, 1926
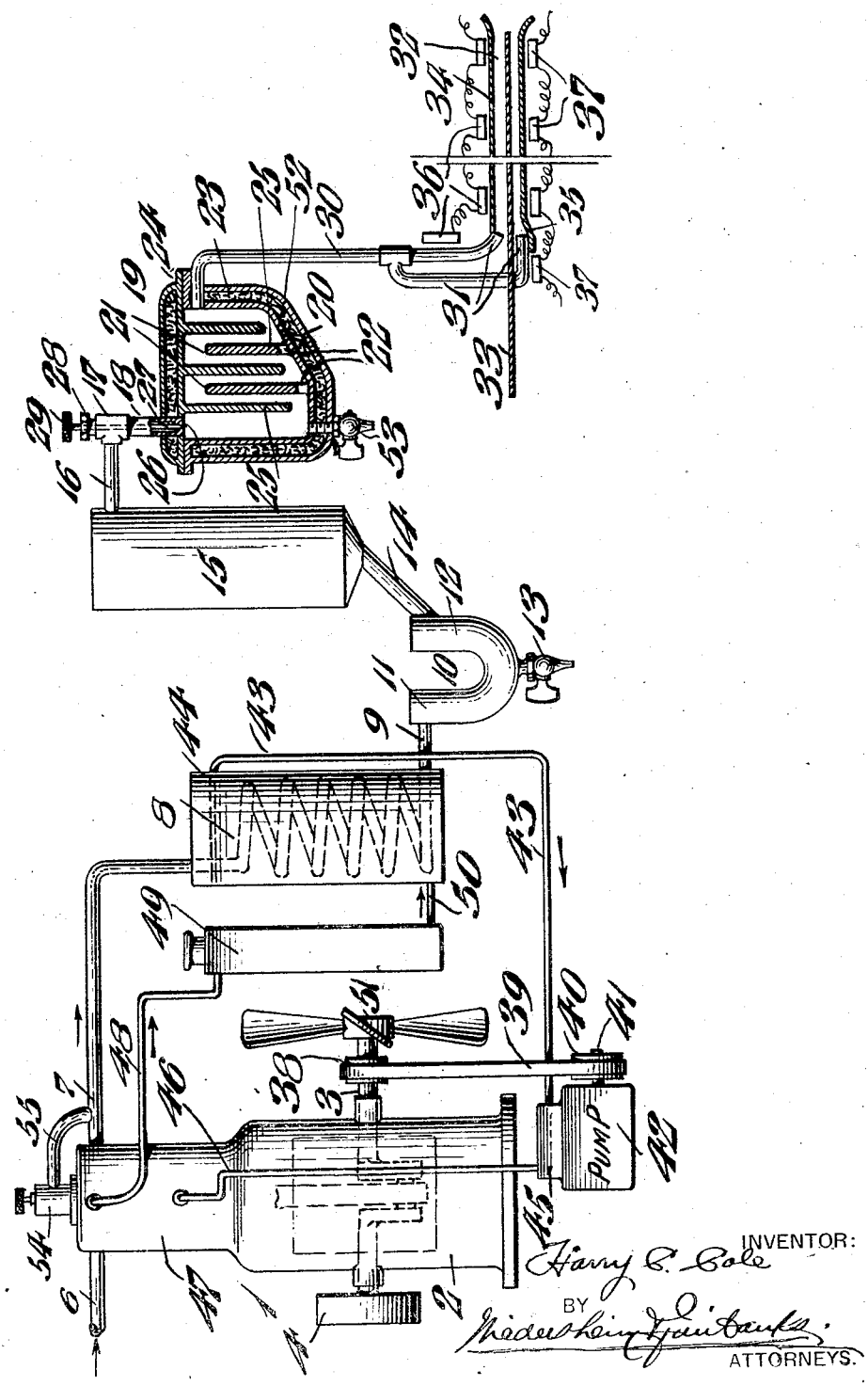

Patented July 5, 1927.

1,634,931

UNITED STATES PATENT OFFICE.

HARRY C. COLE, OF PHILADELPHIA, PENNSYLVANIA.

AIR-DRYING SYSTEM.

Application filed March 5, 1926. Serial No. 92,402.

My invention relates to a novel method of drying air, for use in paper drying or other industrial drying processes, by means of dried air treated by certain novel steps hereinafter referred to, wherein I initially compress the air by any suitable means, then reduce the temperature thereof, thereafter trapping and withdrawing any water of condensation therefrom, after which the air is conducted to an insulated expansion tank, where it is expanded to a very little above atmospheric pressure, means being provided in said expansion tank for entraining and finally withdrawing any further products of condensation, caused by the low temperature to which air is carried by this expansion. The air thus completely freed of moisture, may then be conducted to any suitable drying chamber, through which moving paper sheets, or material to be dried, travel. Provision may further be made for heating the dry air conducting pipe, from my novel air drying system, as well as for heating the top and bottom walls of said drying chamber through which the stock or material passes in the act of being dried, to any desired degree, by electric or other heaters and its temperature can be raised to any desired extent without danger of damage to the most delicate materials, which it may be desired to dry.

My invention further consists of a novel construction of an apparatus, whereby the above steps of my novel method can be carried out.

It further consists of other novel features of construction and advantage, all as will be hereinafter pointed out in the specification and the claims appended hereto.

For the purpose of illustrating my invention, I have shown in the accompanying drawings forms thereof which are at present preferred by me since they will give in practice satisfactory and reliable results, although it is to be understood that the various instrumentalities of which my invention consists can be variously arranged and organized and that my invention is not limited to the precise arrangement and organization of these instrumentalities as herein shown and described.

The figure represents a diagrammatic view, partly in elevation and partly in section, showing one form of apparatus for carrying out my novel method.

In carrying out my invention, I employ an air compressor 1, comprising a casing 2, having a crank or other shaft 3 extending therethrough, one end of said shaft being provided with the pulley 4 to which power is applied by a belt or other suitable means. The shaft 3 actuates an air compressing device of any suitable construction which need not be described in detail and at the upper end of the compressor casing is located the air inlet pipe 6. The compressed air has its exit from the compressor 2 through the pipe 7, from whence the air passes through the coil 8 contained in the condenser 44, where it is cooled (as will be explained) to the pipe 9 and thence into the U-shaped trap 10 provided with the branches 11 and 12.

13 designates a drain or cock at the lower portion of the trap 10, whereby any water of condensation is withdrawn from said trap. 14 designates a pipe leading upwardly from the pipe 12 to the reservoir 15, which is elevated above the trap 10 and from the top of said reservoir leads the pipe 16 to the T-shaped fitting 17 which has the lower branch 18 communicating with the interior of the insulated expansion chamber 19.

I preferably construct the expansion chamber 19 with an insulated body or bottom member 20, having the upwardly extending baffles 21 at whose lower portions are the ports 22. The body portion 20 is provided with double walls or a jacket within which is contained suitable insulation 23. 24 designates the insulated cap of the expansion chamber, which is provided with the upper pendant baffles 25, which are arranged in staggered order with respect to the lower upright baffles 21. It will be noted that the bottom wall 52 of the expansion chamber is inclined, so that moisture will flow downwardly through the ports 22 to the drain cock 53.

26 designates a seat for the needle valve 27 whose valve stem passes through the pipe 18, which is provided with the stuffing box 28 said needle valve having the handle 29, for controlling the flow of the air into the expansion chamber 19.

30 designates the exit pipe for the air, which is connected to the upper portion of the interior of the expansion chamber 19, and has its discharge outlets at the points 31, whereby the air is discharged into the horizontally disposed, longitudinally extending chamber 32 upon both sides of the sheet or material 33 to be dried, which may be a textile fabric or a sheet of any other material, which it is desired to dry and which can be propelled through the chamber 32 by any suitable means, which it is unnecessary to describe in detail.

34 and 35 designate the upper and lower walls of the drying chamber 32 and in proximity to said walls, and to the conducting pipe 30, I arrange the upper and lower series of electric heaters 36 and 37, which may be controlled by switches of any suitable construction.

Referring to the left hand portion of the figure, 38 designates a pulley on the compressor shaft 3, which drives the belt 39 which drives the pulley 40 on the shaft 41 of the pump 42. 43 designates the suction pipe which leads from the top of the tank of condenser 44 to the chamber 45 of the pump 42 from which leads the discharge pipe 46 to the water jacket 47 of the compressor 2, from which leads the pipe 48 to the top of the radiator 49, from the bottom of which leads the pipe 50 to the bottom of the tank or condenser 44. The fan 51 which is for cooling purposes of the radiator water supply is mounted on the shaft 3 in proximity to the radiator 49. In practice, I preferably employ the unloader 54 of the usual construction, having the branch 55 leading therefrom which forms a by-pass to the compressed air exit pipe 7, and as the construction and function of these unloaders is well known, any detailed description thereof is unnecessary.

The operation is as follows:—

The compressed air is conducted from the compressor 2 by the pipe 7 and passes through the coil 8, which is submerged in the water of the condenser 44, whereby its temperature is brought down to approximately atmospheric or room temperature, causing a condensation, which is collected in the trap 10 and drawn off by the valve or drain 13. This air is now conducted to the reservoir 15, where it remains for some time and further condensation takes place.

It will be seen that the reservoir 15 is preferably located at a higher level than the trap 10, with which it is connected by the inclined pipe 14, so that any condensation automatically gravitates or flows from the reservoir 15 through said pipe 14 into the trap 10.

It will consequently be seen that the air in the upper portion of the reservoir 15 has lost a large percentage of its moisture and after being conducted by the pipe 16 to the expansion tank 19, it will be seen that I make further provision in the latter for withdrawing any further residue of entrained moisture, which may be in the air as the latter flows around the baffle plates 25 and 21 through the medium of the drain cock 53.

In this expansion chamber 19 the pressure of the air will be lowered to approximately one pound above atmospheric pressure, and due to this expansion the temperature of air is reduced to a point where further final condensation takes place.

The air, as hereinbefore described, which is withdrawn from the upper portion of the expansion chamber 19, through the pipe 30 is now below atmospheric or room temperature, and it will be apparent that by raising the temperature, its drying effectiveness can be increased by means of the electric heaters 36 and 37, which are placed in proximity to the pipe 30 or its exit branches 31 and the walls 34 and 35. It will be apparent from the foregoing that the material to be dried as 33, which may be in the form of a sheet or web of fabric, paper, or any other material, which be of the most delicate nature, can be dried without injury very effectively and expeditiously.

It will now be apparent that I have devised a novel and useful method and apparatus for drying, which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the inventon or sacrificing any of its advantages.

Having thus described my invention, what I claim as new and desire to secure by Letters Patent is:—

1. An apparatus for drying air comprising an air compressor, a condenser, a pump, a radiator, a suction pipe leading from said condenser to said pump, a discharge pipe leading from the pump to the water jacket of the compressor, a discharge pipe leading from the water jacket of the compressor to said radiator, a connection from said radiator to the lower portion of said condenser, a discharge pipe for the compressed air leading from said compressor through said condenser, a trap into which the air passes after leaving the condenser, a storage tank at a higher level than said trap, and having a pipe leading from the bottom thereof to said trap, whereby any water of condensation gravitates into said trap, an insulated expansion chamber provided with baffles, and a pipe leading from said storage chamber to said expansion chamber, and provided with a valve.

2. An apparatus for drying air comprising a compressor, a condenser, a pump, a radiator, a suction pipe leading from said condenser to said pump, a discharge pipe leading from said pump to the water jacket of the compressor, a discharge pipe leading from the water jacket of the compressor to said radiator, a connection from said radiator to the lower portion of said condenser, a discharge pipe for the compressed air leading from said compressor through said condenser, a trap into which the cooled air passes after leaving the condenser, a storage tank at a higher level than said trap, and having a pipe leading from the bottom thereof to said trap, whereby any water of condensation gravitates into said trap, an insulated expansion chamber provided with upper and lower baffles, a pipe leading from the top of said storage chamber to said expansion chamber and provided with a valve, and an outlet pipe leading from the upper portion of said expansion chamber.

HARRY C. COLE.